United States Patent
Asai et al.

(10) Patent No.: US 8,538,571 B2
(45) Date of Patent: Sep. 17, 2013

(54) SUBSTRATE PROCESSING SYSTEM, GROUP MANAGING APPARATUS, AND METHOD OF ANALYZING ABNORMAL STATE

(75) Inventors: Kazuhide Asai, Toyama (JP); Hiroyuki Iwakura, Toyama (JP); Kazuyoshi Yamamoto, Toyama (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 455 days.

(21) Appl. No.: 12/884,568

(22) Filed: Sep. 17, 2010

(65) Prior Publication Data

US 2011/0079177 A1   Apr. 7, 2011

(30) Foreign Application Priority Data

Oct. 5, 2009 (JP) ................................. 2009-231319

(51) Int. Cl.
*G06F 19/00* (2011.01)

(52) U.S. Cl.
USPC ................................. 700/98; 700/121; 438/10

(58) Field of Classification Search
USPC ................... 700/98, 117–121, 108–110, 296; 438/10; 702/187; 118/696
See application file for complete search history.

(56) References Cited

U.S. PATENT DOCUMENTS

| | | | |
|---|---|---|---|
| 7,738,983 B2 * | 6/2010 | Yamaji et al. | 700/100 |
| 2003/0136663 A1 * | 7/2003 | Smith et al. | 204/192.13 |
| 2004/0073405 A1 * | 4/2004 | Karasawa | 702/188 |
| 2005/0087298 A1 * | 4/2005 | Tanaka et al. | 156/345.24 |
| 2006/0183070 A1 * | 8/2006 | Hirano et al. | 432/253 |
| 2006/0212156 A1 * | 9/2006 | Tanaka et al. | 700/121 |

* cited by examiner

*Primary Examiner* — Kidest Bahta
(74) *Attorney, Agent, or Firm* — Brundidge & Stanger, P.C.

(57) ABSTRACT

A maintenance engineer can analyze an abnormal state with less difficulty in a rapid and correct manner independent of his/her skill. A substrate processing system comprises: a substrate processing apparatus configured to operate according to a recipe defining a process sequence and process conditions, and a group managing apparatus connected to the substrate processing apparatus. The group managing apparatus comprises an analysis support unit. The analysis support unit is configured to extract check item information relating to both abnormal state information for indentifying an abnormal state occurring when the recipe is executed and apparatus type information for identifying the type of the substrate processing apparatus at which the abnormal state occurs, and to prepare a check item table comprising the extracted check item information.

11 Claims, 11 Drawing Sheets

Fig. 5

BASIC INFORMATION INPUT SCREEN — 520a

New Sequence

| ABNORMAL STATE INFORMATION | APPARATUS INFORMATION | RECIPE INFORMATION |
|---|---|---|
| IN-SURFACE FILM THICKNESS ERROR | Tube01 | Recipe500A |

↑ ↑ ↑

| | | |
|---|---|---|
| IN-SURFACE FILM THICKNESS ERROR | Tube01 | Recipe500A |
| BETWEEN-SURFACES FILM THICKNESS ERROR | Tube02 | Recipe300A |
| FILM THICKNESS DECREASE ERROR | Tube03 | Purge |
| PARTICLES | Tube04 | |
| ... | Tube05 | |
| ... | Tube06 | |

Fig. 6

CHECK ITEM TABLE — 520b

RESULT CSV OUPUT

| No. | TITLE | CHECK ITEM | TARGET STEP | CHECK ITEM INFORMATION | END | CHECK RESULTS |
|---|---|---|---|---|---|---|
| 1 | RECIPE FACTOR CHECK | TEMPERATURE | ALL | MONITOR VALUE WAVEFORM SUPERPOSITION | ☐ | If different, it may be due to abnormal temperature. |
| 3 | | MFC | FILM FORMING | MONITOR VALUE MAX/MIN/AVERAGE TRENDS | ✔ | If different, it may be due to decrease in temperature repeatibility. |
| 4 | | PRESSURE | FILM FORMING | MONITOR VALUE MAX/MIN/AVERAGE TRENDS | ✔ | If different, it may be due to decrease in temperature repeatibility. |

Fig. 8

ABNORMAL STATE ANALYSIS INFORMATION TABLE  503a

| No. | TITLE | CHECK ITEMS | ABNORMAL STATE INFORMATION | | | | APPARATUS TYPE INFORMATION | | | CHECK ITEM INFORMATION | CHECKED |
|---|---|---|---|---|---|---|---|---|---|---|---|
| | | | IN-SURFACE | BETWEEN SURFACES | DEC-REASE | WASTE | DIFFU-SION | CVD | ALD | | |
| 1 | RECIPE ACTOR CHECK | TEMP. | O | O | | O | O | O | O | MONITOR VALUE WAVEFORM SUPERPOSITION | ☐ |
| 2 | | | | | O | | O | O | O | MONITOR VALUE AVERAGE TREND | ☐ |
| 3 | | MFC | O | O | O | O | O | O | O | MONITOR VALUE MAX/MIN/AVEAGE TRENDS | ☐ |
| 4 | | PRESSURE | O | O | O | O | | O | O | MONITOR VALUE MAX/MIN/AVEAGE TRENDS | ☐ |
| 5 | | CKD OPENING | O | O | | O | | O | O | MONITOR VALUE WAVEFORM SUPERPOSITION | ☐ |
| 6 | | | O | O | | | | O | O | MONITOR VALUE MAX/MIN/AVEAGE TRENDS | ☐ |
| 7 | | RF | O | O | | | | | O | MONITOR VALUE WAVEFORM SUPERPOSITION (REPETITION IN BATCH) | ☐ |
| 8 | | | O | O | | | | | O | TREND FROM START TO 10 SEC | ☐ |
| 9 | | OZONIZER CONTENT | O | O | | | | | O | MONITOR VALUE WAVEFORM SUPERPOSITION | ☐ |
| 10 | | | O | O | | | | | O | MONITOR VALUE MAX/MIN/AVEAGE TRENDS | ☐ |

BASIC INFORMATION
ABNORMAL STATE INFORMATION 「IN-SURFACE」
APPARATUS INFORMATION 「Tube01」
RECIPE INFORMATION 「Recipe500A」
503c APPARATUS TYPE BASED TABLE
APPARATUS : APPARATUS TYPE
INFORMATION   INFORMATION
「Tube01」:「CVD」
「Tube02」:「CVD」
「Tube03」:「ALD」
...
503b ROWS MARKED WITH "O" IN BOTH ABNORMAL STATE INFORMATION AND APPARATUS TYPE INFORMATION ARE SELECTED   520b

[☐] CHECK ITEM TABLE

RESULT CSV OUPUT

| No. | TITLE | CHECK ITEM | TARGET STEP | CHECK ITEM INFORMATION | END | CHECK RESULTS |
|---|---|---|---|---|---|---|
| 1 | RECIPE FACTOR CHECK | TEMPERATUR | ALL | MONITOR VALUE WAVEFORM SUPER-POSITION | ☐ | If different, it may be due to abnormal temperature. |
| 3 | | MFC | FILM FORMING | MONITOR VALUE MAX/MIN/AVERAGE TRENDS | ☐ | If different, it may be due to decrease in temperature repeatibility. |
| 4 | | PRESSURE | FILM FORMING | MONITOR VALUE MAX/MIN/AVERAGE TRENDS | ☐ | If different, it may be due to decrease in temperature repeatibility. |

SUBSTRATE PROCESSING SYSTEM, GROUP MANAGING APPARATUS, AND METHOD OF ANALYZING ABNORMAL STATE

CROSS-REFERENCE TO RELATED PATENT APPLICATION

This U.S. non-provisional patent application claims priority under 35 U.S.C. §119 of Japanese Patent Application No. 2009-231319, filed on Oct. 5, 2009, in the Japanese Patent Office, the entire contents of which are hereby incorporated by reference.

BACKGROUND OF THE INVENTION

1. Field of the Invention

The present invention relates to a substrate processing system including a substrate processing apparatus operating according to a recipe defining process sequences and process conditions and a group managing apparatus connected to the substrate processing apparatus, and a method of analyzing an abnormal state of the substrate processing apparatus.

2. Description of the Related Art

In a substrate processing apparatus operating according to a recipe defining process sequences and conditions, data (for example, time-series data such as temperatures, gas mass flows, and pressures) indicating recipe progress states and states of the substrate processing apparatus are generated at a plurality of parts (such as a temperature sensor, a gas mass flow meter, and a pressure gauge; hereinafter, these parts will be referred to as data generating parts. If the recipe is abnormally executed or the state of the substrate processing apparatus is abnormal, a maintenance engineer of the substrate processing apparatus hears information such as "abnormal state information", "substrate processing apparatus information", and "abnormal state occurring time" from an user of the substrate processing apparatus, and the maintenance engineer checks data of the substrate processing apparatus based on the information so as to analyze a cause of the abnormal state (hereinafter, analysis of a cause of an abnormal state will be referred to as an abnormal state analysis).

However, since there are many candidate items to be checked, abnormal state analysis may be incorrectly carried out or it may take much time to analyze the abnormal state according to the skill of the maintenance engineer. For example, after a thin film forming recipe is executed on a substrate, if there is an abnormal state such as "decrease in the in-surface uniformity of a thin film", a plurality of check items such as the inside temperature (process temperature) of a process chamber in which the substrate is accommodated, the mass flow of gas supplied into the process chamber, and the inside pressure of the process chamber can be candidate check items. Therefore, according to the skill of the maintenance engineer, some of necessary check items may not be checked, and thus abnormal state analysis may be incorrectly conducted. In addition, according to the skill of the maintenance engineer, unnecessary items may be checked, and thus time may be wasted.

In addition, although the skill of the maintenance engineer is fairly good, it may take a long time for the maintenance engineer to collect necessary data according to check items. For example, if it is necessary to check the difference between data (for example, process temperature or pressure) of the abnormal substrate processing apparatus and data of another substrate processing apparatus, the maintenance engineer may have to collect predetermined data from the abnormal substrate processing apparatus while collecting corresponding data from the other substrate processing apparatus. Therefore, if the other substrate processing apparatus is distant from the abnormal substrate processing apparatus or it is necessary to collect a large amount of data, it may take significant time to analyze the abnormal state.

SUMMARY OF THE INVENTION

An object of the present invention is to provide a substrate processing system an abnormal state of which can be analyzed by a maintenance engineer with less difficulty in a rapid and correct manner independent of the skill of the maintenance engineer.

According to an aspect of the present invention, there is provided substrate processing system comprising: a substrate processing apparatus configured to operate according to a recipe defining a process sequence and process conditions; and a group managing apparatus connected to the substrate processing apparatus, wherein the group managing apparatus comprises: a storage unit configured to store an apparatus type information specifying a type of the substrate processing apparatus in an abnormal state by relating to an apparatus information indicating the substrate processing apparatus in the abnormal state, and a check item information specifying a check item necessary for analyzing a cause of the abnormal state related to the apparatus type information and an abnormal state information specifying the abnormal state occurring during an execution of the recipe; and an analysis support unit configured to receive a basic information comprising the abnormal state information and the apparatus information, acquire the apparatus type information related to the apparatus information by referring to the storage unit, extract the check item information related to the apparatus type information and the abnormal state information, and prepare a check item table comprising extracted check item information.

BRIEF DESCRIPTION OF THE DRAWINGS

FIG. 5 is a schematic diagram illustrating an exemplary basic information input screen according to the embodiment of the present invention.

FIG. 6 is a schematic diagram illustrating an exemplary check item table according to the embodiment of the present invention.

FIG. 8 is a schematic diagram illustrating a part of an exemplary abnormal information analysis table and a way of preparing a check item table based on basic information, tables acquired according to the kinds of apparatuses, and the abnormal information analysis table, according to the embodiment of the present invention.

DETAILED DESCRIPTION OF THE PREFERRED EMBODIMENTS

Embodiment of the Present Invention

Hereinafter, an embodiment of the present invention will be described.

(1) Structure of Substrate Processing System

Figure 1:
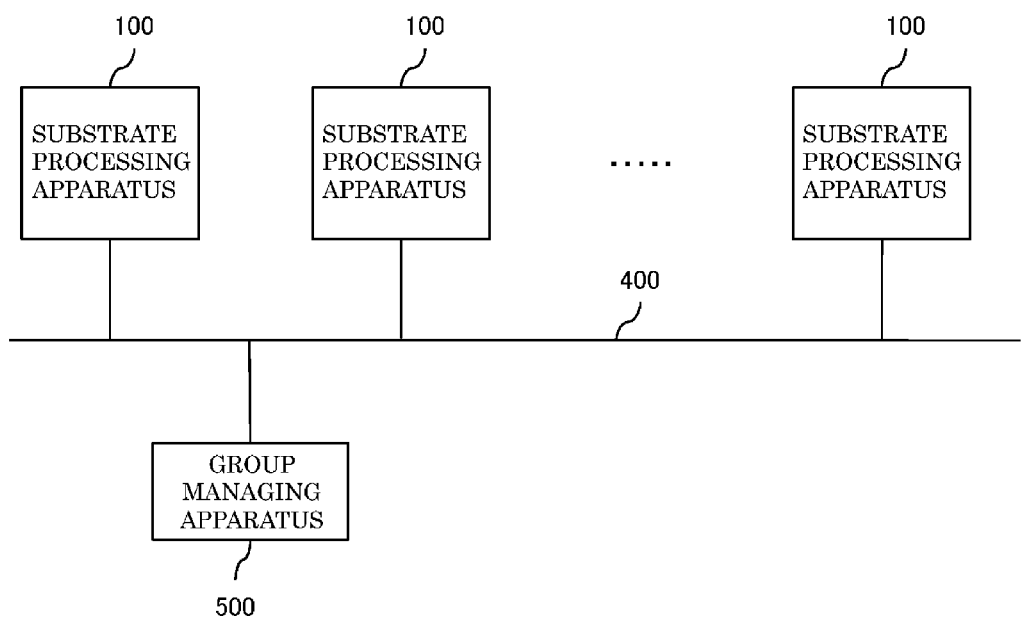
FIG. 1 is a schematic diagram illustrating a substrate processing system according to the embodiment of the present invention.

First, with reference to FIG. 1, an explanation will be given on substrate processing system according to an embodiment of the present invention. FIG. 1 is a schematic view illustrating a substrate processing system according to an embodiment of the present invention.

As shown in FIG. 1, the substrate processing system of the current embodiment includes at least one substrate processing apparatus 100 operating according to a recipe defining process sequences and conditions, and a group managing apparatus 500 connected to the substrate processing apparatus 100 for exchanging data with the substrate processing apparatus 100. The substrate processing apparatus 100 and the group managing apparatus 500 are connected through a network 400 such as a local area network (LAN) or a wide area network (WAN).

(2) Structure of Substrate Processing Apparatus

Figure 10:
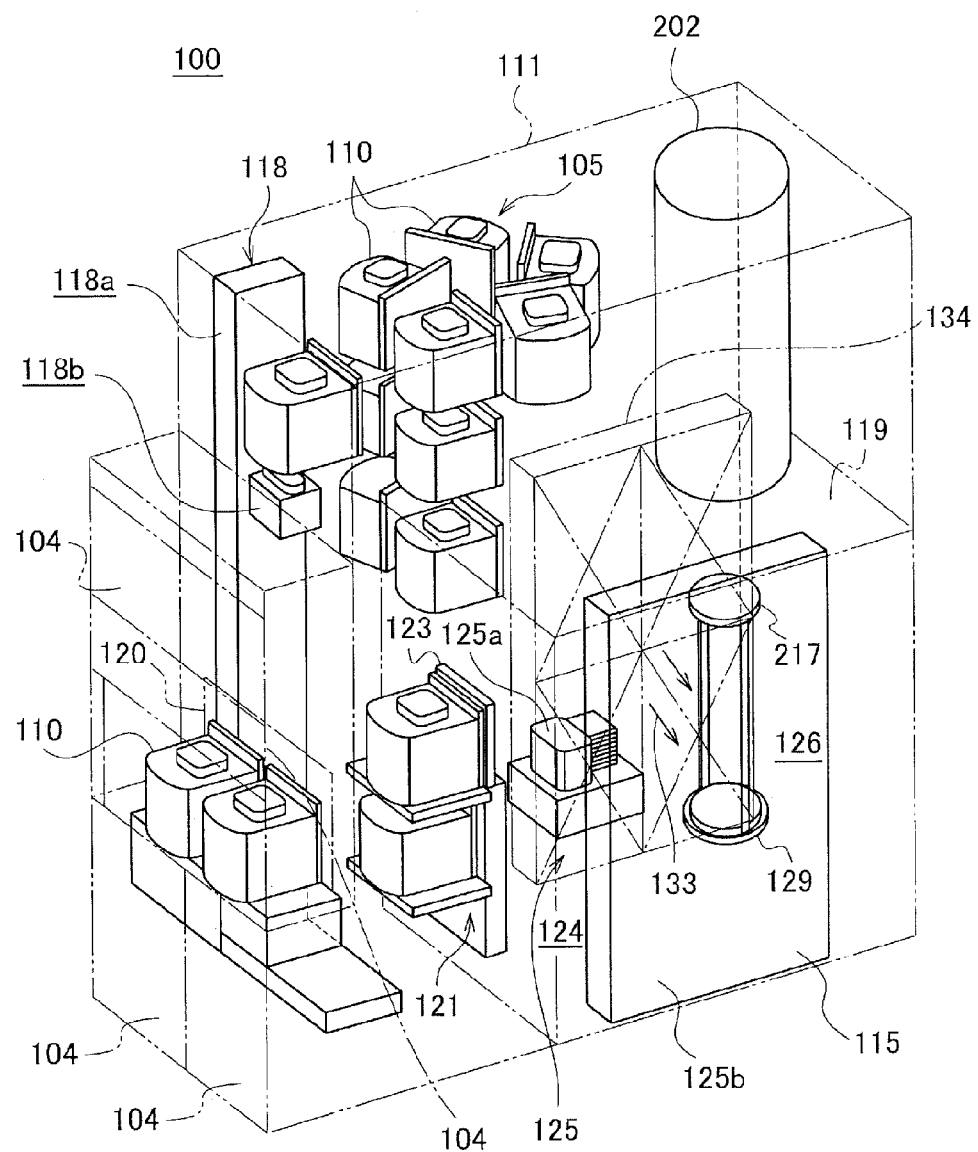
FIG. 10 is a perspective diagram illustrating the substrate processing apparatus according to the embodiment of the present invention.
Figure 11:
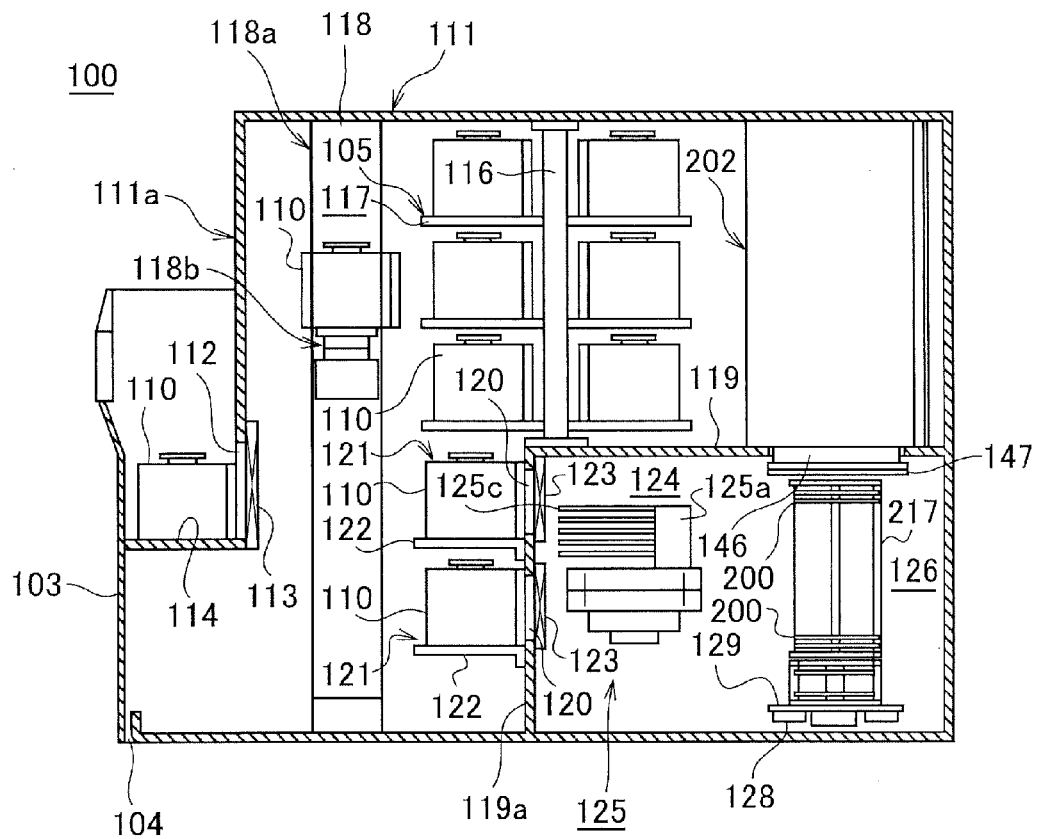
FIG. 11 is a side sectional diagram illustrating the substrate processing apparatus according to the embodiment of the present invention.

Next, with reference to FIG. 10 and FIG. 11, the structure of the substrate processing apparatus 100 will now be explained according to the current embodiment of the present invention. FIG. 10 is a perspective diagram illustrating the substrate processing apparatus 100 according to the current embodiment of the present invention. FIG. 11 is a side sectional diagram illustrating the substrate processing apparatus 100 according to the current embodiment of the present invention. The substrate processing apparatus 100 of the current embodiment is configured as a vertical apparatus configured to perform a process such as an oxidation process, a diffusion process, or a chemical vapor deposition (CVD) process on a substrate such as a wafer.

As shown in FIG. 10 and FIG. 11, the structure of the substrate processing apparatus 100 of the present invention includes a case 111 as a pressure-resistant vessel. At the lower side of a front wall 111a of the case 111, an opening is formed as a front maintenance entrance 103 for maintenance works. At the front maintenance entrance 103, a pair of front maintenance doors 104 is installed for closing and opening the front maintenance entrance 103. Pods (substrate containers) 110 in which wafers (substrates) 200 are accommodated are used as carriers configured to carry wafers 200 into and out of the case 111.

At the front wall 111a of the case 111, a pod carrying entrance (substrate container carrying entrance) 112 is formed to connect the inside and outside of the case 111. The pod carrying entrance 112 is configured to be opened and closed by a front shutter (substrate container carrying entrance opening/closing mechanism) 113. At the front side of the pod carrying entrance 112, a load port (substrate container stage) 114 is installed. The pods 110 are configured to be adjusted in positions when placed on the load port 114. The pods 110 are configured to be carried onto the load port 114 by an in-process carrying device (not shown).

Near the upper center part of the inside of the case 111 in a front-to-back direction, a rotatable pod shelf (substrate container shelf) 105 is installed. A plurality of pods 110 can be stored on the rotatable pod shelf 105. The rotatable pod shelf 105 includes a pillar 116 which is vertically installed and intermittently rotatable on a horizontal plane, and a plurality of shelf plates (substrate container stages) 117 which are radially supported at upper, middle, and lower positions of the pillar 116. The shelf plates 117 are configured so that a plurality of pods 110 can be placed and held on each of the shelf plates 117.

At the inside of the case 111 between the load port 114 and the rotatable pod shelf 105, a pod carrying device (substrate container carrying device) 118 is installed. The pod carrying device 118 includes a pod elevator (substrate container elevating mechanism) 118a capable of moving upward and downward while holding a pod 110, and a pod carrying mechanism (substrate container carrying mechanism) 118b as a carrying mechanism. The pod carrying device 118 is configured such that a pod 110 can be carried among the load port 114, the rotatable pod shelf 105, and pod openers (substrate container cover opening/closing mechanism) 121 by continuous operations of the pod elevator 118a and the pod carrying mechanism 118b.

At the lower inside part of the case 111, a sub case 119 is installed in a manner such that the sub case 119 extends from about the center part to the rear part of the case 111 in a front-to-back direction. In order to carry wafers 200 into and out of the sub case 119, a pair of wafer carrying entrances (substrate carrying entrances) 120 are formed at a front wall 119a of the sub case 119 in a manner such that the wafer carrying entrances 120 are vertically arranged in two stages. At the upper and lower wafer carrying entrances 120, the pod openers 121 are installed, respectively.

Each of the pod openers 121 includes a stage 122 and a cap attachment/detachment mechanism (cover attachment/detachment mechanism) 123 configured to attach and detach a cap (cover) of a pod 110. Each of the pod opener 121 is configured to attach and detach a cap of a pod 110 placed on the stage 122 for closing and opening a wafer entrance of the pod 110.

A transfer chamber 124 is formed in the sub case 119 in a manner such that the transfer chamber 124 is fluidically isolated from a space where parts such as the pod carrying device 118 and the rotatable pod shelf 105 are installed. At the front region of the transfer chamber 124, a wafer transfer mechanism (substrate transfer mechanism) 125 is installed. The wafer transfer mechanism 125 includes a wafer transfer device (substrate transfer device) 125a capable of rotating or straightly moving wafers 200 on a horizontal plane, and a wafer transfer device elevator (substrate transfer device elevator) 125b capable of moving the wafer transfer device 125a upward and downward. As shown in FIG. 10, the wafer transfer device elevator 125b is installed between the right end part of the front region of the transfer chamber 124 of the sub case 119 and the right end part of the case 111. The wafer transfer device 125a includes tweezers (substrate holders) 125c as stages for placing wafers 200 thereon. By continuous operations of the wafer transfer device elevator 125b and the wafer transfer device 125a, wafers 200 can be charged into a boat (substrate holding tool) 217 or discharged from the boat 217.

In the rear region of the transfer chamber 124, a standby section 126 is provided so as to accommodate the boat 217 in standby state. At the upper side of the standby section 126, a process furnace 202 is installed as a substrate processing system. The bottom side of the process furnace 202 is configured to be closed by a furnace port shutter (furnace opening/closing mechanism) 147.

As shown in FIG. 10, between the right end part of the standby section 126 of the sub case 119 and the right side of the case 111, a boat elevator (substrate holding tool elevating mechanism) 115 is installed. A connecting tool such as an arm 128 is connected to an elevator base of the boat elevator 115. A cover such a seal cap 219 is horizontally attached to the arm 128. The seal cap 219 is configured to support the boat 217 vertically and close the bottom side of the process furnace 202.

The boat 217 includes a plurality of holding members. The boat 217 is configured to hold a plurality of wafers 200 (for example, fifty to one hundred twenty five wafers) horizontally in a state where the centers of the wafers 200 are vertically aligned.

As shown in FIG. 10, at the left end part of the transfer chamber 124 opposite to the wafer transfer device elevator 125b and the boat elevator 115, a cleaning unit 134 configured by a supply fan and a dust filter is installed so as to supply cleaned atmosphere or inter gas as clean air 133. Between the wafer transfer device 125a and the cleaning unit 134, a notch alignment device (not shown) is installed as a substrate matching device for aligning the circumferences of wafers.

Clean air 133 blown from the cleaning unit 134 flows around the notch alignment device (not shown), the wafer transfer device 125a, and the boat 217 disposed at the standby section 126. Then, the air 133 is sucked through a duct (not shown) and is exhausted to the outside of the case 111, or the air 133 is circulated back to a suction side of the cleaning unit 134, that is, a primary side (supply side) of the cleaning unit 134, so as to be blown back to the transfer chamber 124 by the cleaning unit 134.

(3) Operation of Substrate Processing Apparatus

Next, the operation of the substrate processing apparatus 100 of the current embodiment will be described with reference to FIG. 10 and FIG. 11.

As shown in FIG. 10 and FIG. 11, when a pod 110 is supplied to the load port 114, the pod carrying entrance 112 is opened by moving the front shutter 113. Then, the pod 110 is carried into the case 111 through the pod carrying entrance 112 by the pod carrying device 118.

The pod 110 carried into the case 111 is automatically carried to the shelf plate 117 of the rotatable pod shelf 105 by the pod carrying device 118 and is temporarily stored on the shelf plate 117, and then the pod 110 is transferred to the stage 122 of one of the pod openers 121. Alternatively, the pod 110 carried into the case 111 may be directly transferred to the stage 122 of the pod opener 121. At this time, the wafer carrying entrance 120 of the pod opener 121 is closed by the cap attachment/detachment mechanism 123, and clean air 133 is circulated and filled in the transfer chamber 124. For example, nitrogen gas is filled in the transfer chamber 124 as clean air 133 so as to keep the oxygen content of the inside of the transfer chamber 124, for example, at 20 ppm or lower, which is much lower than the oxygen content of the inside of the case 111 kept at atmosphere.

When the pod 110 is placed on the stage 122, the opening-side of the pod 110 is pressed by the edge of the wafer carrying entrance 120 of the front wall 119a of the sub case 119, and along with this, the cap of the pod 110 is detached by the cap attachment/detachment mechanism 123, so that the wafer entrance of the pod 110 can be opened. Thereafter, wafers 200 are picked up from the pod 110 through the wafer entrance of the pod 110 by the tweezers 125c of the wafer transfer device 125a, and after the orientations of the wafers 200 are aligned by the notch alignment device, the wafers 200 are carried to the standby section 126 located at the rear side of the transfer chamber 124 and charged into the boat 217 (wafer charging). After the wafer transfer device 125a charges the wafers 200 into the boat 217, the wafer transfer device 125a returns to the pod 110 for charging the next wafers 200 into the boat 217.

While wafers 200 are charged into the boat 217 from the side of one (upper or lower one) of the pod openers 121 by the wafer transfer mechanism 125, another pod 110 is concurrently carried to and placed on the stage 122 of the other (lower or upper one) of the pod openers 121 from the rotatable pod shelf 105 by the pod carrying device 118, and the other pod opener 121 opens the wafer entrance of the other pod 110.

After a predetermined number of wafers 200 are charged into the boat 217, the bottom side of the process furnace 202 closed by the furnace port shutter 147 is opened by moving the furnace port shutter 147. Then, the boat 217 in which the wafers 200 are held is loaded into the process furnace 202 by lifting the seal cap 219 using the boat elevator 115 (boat loading).

After the loading operation, a predetermined process is performed on the wafers 200 disposed in the process furnace 202. After the process, in approximately the reverse order to the above-described loading order except for the alignment of wafers by the notch alignment device, the boat 217 in which the processed wafers 200 are stored is carried out from the inside of the process furnace 202, and then pods 110 in which the processed wafers 200 are accommodated are carried out of the case 111.

(4) Structure of Process Furnace

Next, the process furnace 202 of the current embodiment will be described with reference to FIG. 12.

Figure 12:
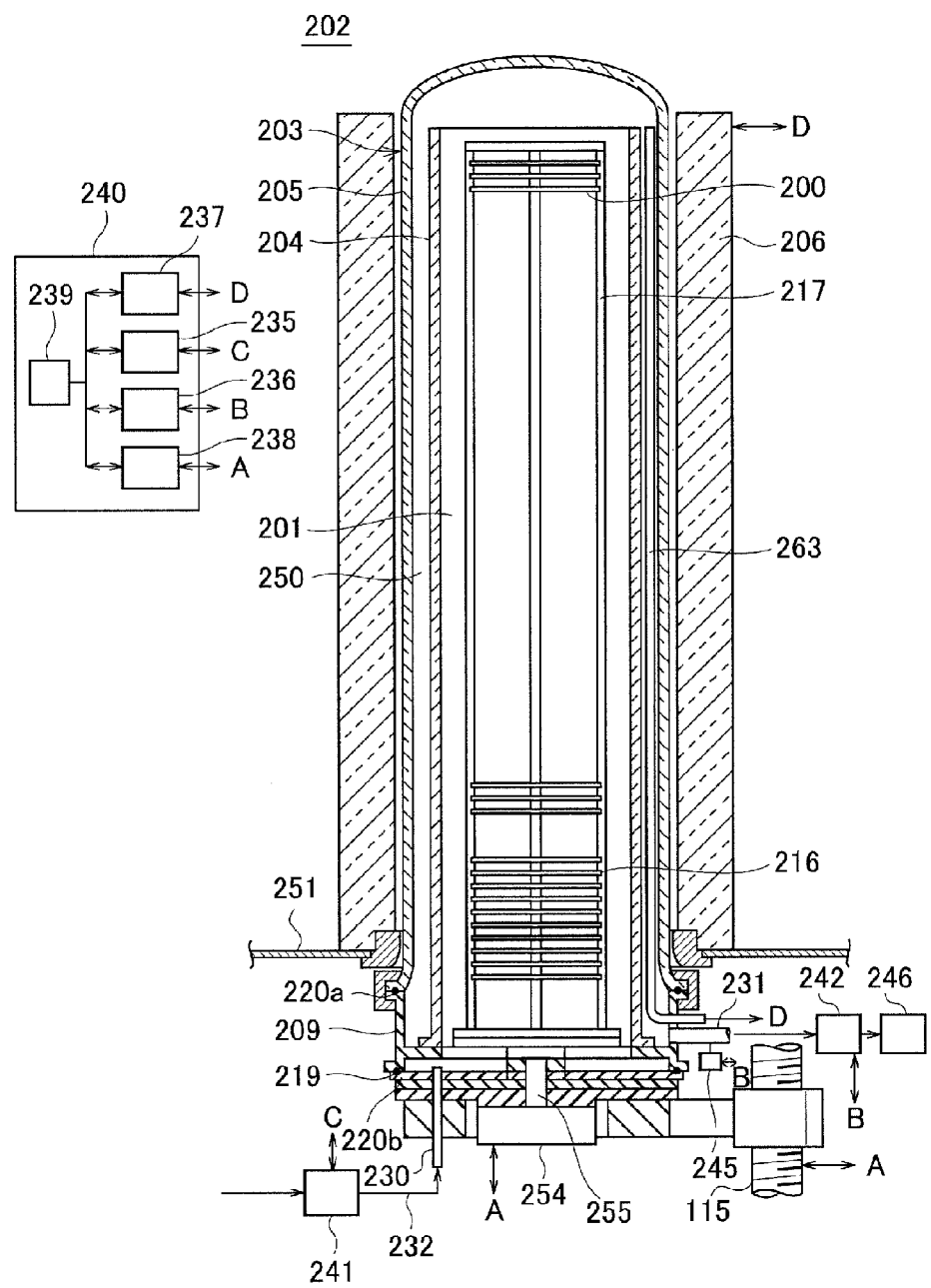
FIG. 12 is a vertical sectional diagram illustrating a process furnace of the substrate processing apparatus according to the embodiment of the present invention.

FIG. 12 is a vertical sectional diagram illustrating the process furnace 202 of the substrate processing apparatus 100 according to the embodiment of the present invention.

As shown in FIG. 12, the process furnace 202 includes a process tube 203 as a reaction tube. The process tube 203 includes an inner tube 204 as an inner reaction tube and an outer tube 205 installed outside the inner tube 204 as an outer reaction tube. The inner tube 204 is made of a heat resistant material such as quartz (SiO2) or silicon carbide (SiC) and has a cylindrical shape with opened top and bottom sides. A process chamber 201 is formed in a hollow part of the inner tube 204 so that substrates such as wafers 200 can be processed in the process chamber 201. The process chamber 201 is configured so that the boat 217 (described later) can be accommodated in the process chamber 201. The outer tube 205 is installed coaxially with the inner tube 204. The outer tube 205 has a cylindrical shape having a closed top side and an opened bottom side, and the inner diameter of the outer tube 205 is larger than the outer diameter of the inner tube 204. The outer tube 205 is made of a heat resistant material such as quartz or silicon carbide.

At the outer side of the process tube 203, a heater 206 is installed as a heating mechanism in a manner such that the heater 206 surrounds the sidewall of the process tube 203. The heater 206 has a cylindrical shape and is vertically installed in a state where the heater 206 is supported by a heater base 251 which is a holding plate.

At the lower side of the outer tube 205, a manifold 209 is installed coaxially with the outer tube 205. The manifold 209 is made of a material such as stainless steel and has a cylindrical shape with opened top and bottom sides. The manifold 209 is engaged with the bottom sides of the inner tube 204 and the outer tube 205 for supporting the inner tube 204 and the outer tube 205. Between the manifold 209 and the outer tube 205, an O-ring 220a is installed as a sealing member. The manifold 209 is supported by the heater base 251 so that the process tube 203 can be vertically installed. The process tube 203 and the manifold 209 constitute a reaction vessel.

A nozzle 230 is connected to the seal cap 219 (described later) in communication with the inside of the process chamber 201 as a gas introduction part. A gas supply pipe 232 is connected to the nozzle 230. A process gas supply source (not shown) or an inert gas supply source (not shown) is connected to the upstream side of the gas supply pipe 232 (opposite to the nozzle 230), and a mass flow controller (MFC) 241 used as a gas flow control device is disposed between the upstream side of the gas supply pipe 232 and the gas supply source. A gas mass flow control unit 235 is electrically connected to the MFC 241. The gas mass flow control unit 235 is configured to control the MFC 241 so that the mass flow of gas supplied into the process chamber 201 can be adjusted to a desired level at a desired time.

At the manifold 209, an exhaust pipe 231 is installed to exhaust the inside atmosphere of the process chamber 201. The exhaust pipe 231 is disposed at a lower end side of a cylindrical space 250 formed between the inner tube 204 and the outer tube 205 and communicates with the cylindrical space 250. At the downstream side of the exhaust pipe 231 (opposite to the manifold 209), a pressure detector such as a pressure sensor 245, a pressure adjusting device 242 configured by, for example, an auto pressure controller (APC), and a vacuum exhaust device 246 such as a vacuum pump are sequentially connected from the upstream side. A pressure control unit 236 is electrically connected to the pressure adjusting device 242 and the pressure sensor 245. The pressure control unit 236 is configured to control the pressure adjusting device 242 based on a pressure value detected by the pressure sensor 245 so as to adjust the inside pressure of the process chamber 201 to a desired level at a desired time.

At the lower side of the manifold 209, the seal cap 219 is installed as a furnace port cover for air-tightly closing the opened bottom side of the manifold 209. The seal cap 219 is configured to make contact with the bottom side of the manifold 209 in a vertical direction from the lower side of the manifold 209. The seal cap 219 is made of a metal such as stainless steel and has a disk shape. At the top surface of the seal cap 219, an O-ring 220b is installed as a sealing member to make contact with the bottom side of the manifold 209. At a center side of the seal cap 219 opposite to the process chamber 201, a rotation mechanism 254 is installed. A shaft 255 of the rotation mechanism 254 is inserted through the seal cap 219 to support bottom side of the boat 217.

The rotation mechanism 254 is configured to rotate wafers 200 by rotating the boat 217. The seal cap 219 is configured to be vertically moved by an elevating mechanism such as the boat elevator 115 vertically installed outside the process tube 203. By lifting or lowering the seal cap 219, the boat 217 can be loaded into the process chamber 201 or unloaded from the process chamber 201. A carrying control unit 238 is electrically connected to the rotation mechanism 254 and the boat elevator 115. The carrying control unit 238 is configured to control the rotation mechanism 254 and the boat elevator 115 so that desired operations of the rotation mechanism 254 and the boat elevator 115 can be performed at desired times.

As described above, the boat 217 which is a substrate holding tool is configured to hold a plurality of wafers 200 in a manner such that the wafers 200 are horizontally positioned and arranged in multiple stages with the centers of the wafers 200 being aligned. The boat 217 is made of a heat resistant material such as quartz or silicon carbide. At the lower side of the boat 217, a plurality of insulating plates 216, which are made of a heat resistant material such as quartz or silicon carbide and have a disk shape, are horizontally disposed in multiple stages as insulating members for preventing heat transfer from the heater 206 to the manifold 209.

Inside the process tube 203, a temperature sensor 263 is installed as a temperature detector. A temperature control unit 237 is electrically connected to the heater 206 and the temperature sensor 263. Based on temperature information detected by the temperature sensor 263, the temperature control unit 237 is configured to control power supplied to the heater 206 so as to obtain desired temperature distribution in the process chamber 201 at a desired time.

The gas mass flow control unit 235, the pressure control unit 236, the carrying control unit 238, and the temperature control unit 237 are electrically connected to a process control unit 239a configured to control the overall operation of the substrate processing apparatus 100 (hereinafter, the gas mass flow control unit 235, the pressure control unit 236, the carrying control unit 238, and the temperature control unit 237 will also be referred as I/O control units). The gas mass flow control unit 235, the pressure control unit 236, the carrying control unit 238, the temperature control unit 237, and the process control unit 239a are configured as a substrate processing apparatus controller 240. The structure and operation of the substrate processing apparatus controller 240 will be described later.

(5) Operation of Process Furnace

Next, as an exemplary semiconductor device manufacturing process, a method of forming a thin film on a wafer 200 by a CVD method using the above-described processing furnace 202 will be explained with reference to FIG. 12. In the following description, each part of the substrate processing apparatus 100 is controlled by the substrate processing apparatus controller 240.

If a plurality of wafers 200 are charged into the boat 217, the boat elevator 115 lifts the boat 217 in which the wafers 200 are held, so that the boat 217 can be loaded into the process chamber 201 (boat loading). In this state, the bottom side of the manifold 209 is sealed by the seal cap 219 with the O-ring 220b being disposed therebetween.

The inside of the process chamber 201 is evacuated to a desired pressure (vacuum degree) by the vacuum exhaust device 246. At this time, based on a pressure value measured by the pressure sensor 245, the pressure adjusting device 242 (the degree of valve opening of the pressure adjusting device 242) is feedback-controlled. In addition, the process chamber 201 is heated by the heater 206 to a desired temperature. At this time, based on a temperature value detected by the temperature sensor 263, power to the heater 206 is feedback-controlled. Next, the boat 217 and the wafers 200 are rotated by the rotation mechanism 254.

Thereafter, gas supplied from the process gas supply source while the mass flow of the gas is controlled by the MFC 241 is introduced into the process chamber 201 through the gas supply pipe 232 and the nozzle 230. The introduced gas flows upward inside the process chamber 201 and is discharged from the opened top side of the inner tube 204 to the cylindrical space 250 where the gas is exhausted through the exhaust pipe 231. When the gas passes through the process chamber 201, the gas makes contact with the surfaces of the wafers 200 so that thin films can be deposited on the surfaces of the wafers 200 by thermal CVD reaction.

After a preset time, inert gas is supplied from the inert gas supply source to replace the inside atmosphere of the process chamber 201 with the inert gas, and at this time, the pressure inside the process chamber 201 returns to atmospheric pressure.

After that, the seal cap 219 is moved down by the boat elevator 115 to open the bottom side of the manifold 209 and unload the boat 217, in which the processed wafers 200 are held, from the process tube 203 to the outside through the opened bottom side of the manifold 209 (boat unloading). Then, the processed wafers 200 are discharged from the boat 217 and carried into pods 110 (wafer discharging).

(6) Structure of Substrate Processing Apparatus Controller

Figure 2:
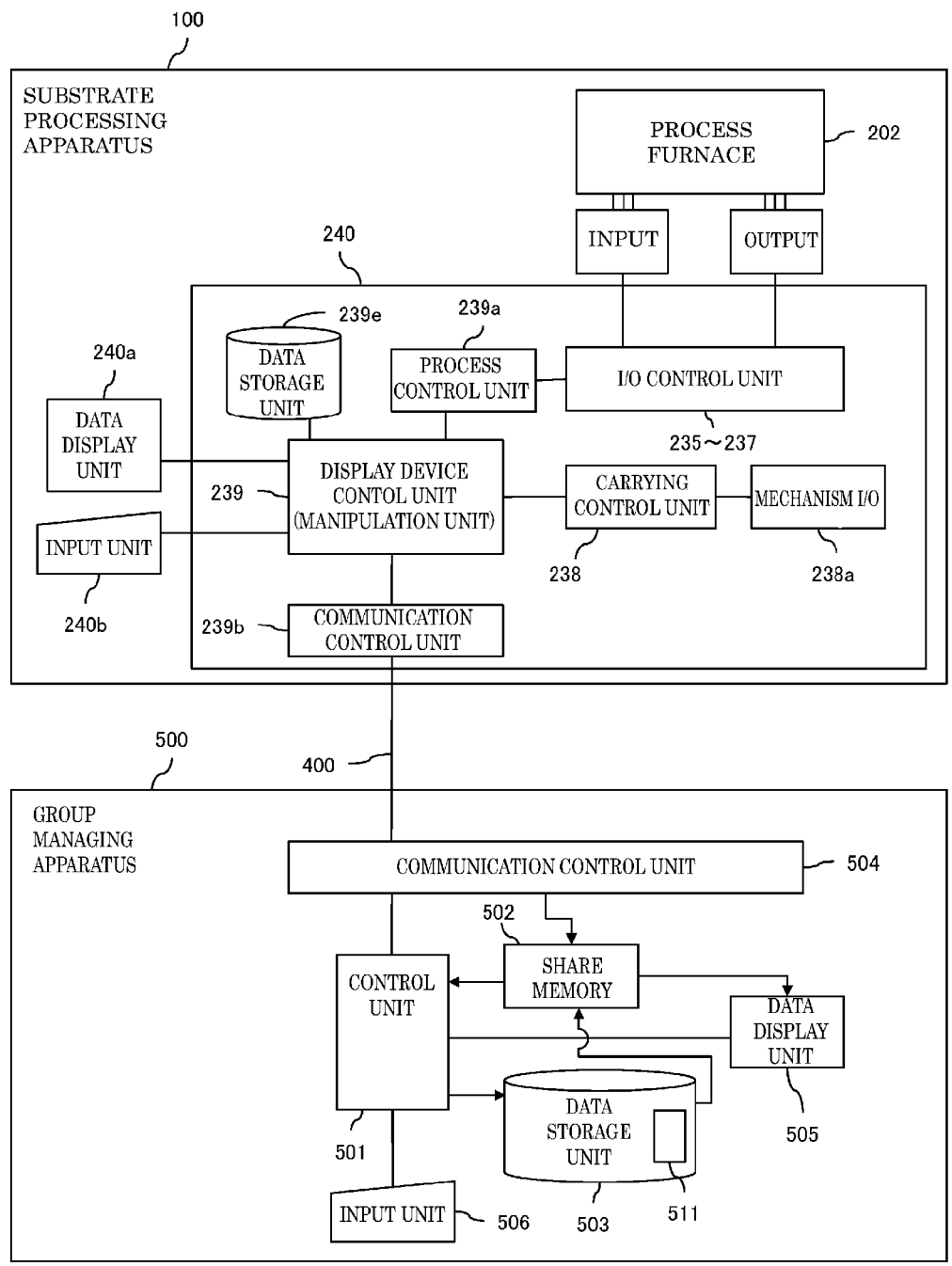
FIG. 2 is a block diagram illustrating a substrate processing apparatus and a group managing apparatus of the substrate processing system according to the embodiment of the present invention.

Next, with reference to FIG. 2, the structure of the substrate processing apparatus controller 240 will now be explained according to the current embodiment. FIG. 2 is a block diagram illustrating the substrate processing apparatus 100 and the group managing apparatus 500 according to the embodiment of the present invention.

The substrate processing apparatus controller 240 includes the I/O control units (the gas mass flow control unit 235, the pressure control unit 236, and the temperature control unit 237), and the process control unit 239a which is connected to the I/O control units in a manner such that the process control unit 239a can exchange data with the I/O control units. The process control unit 239a is configured to collect (read) data indicating the states (such as temperature, gas mass flow, and pressure) of the process furnace 202 while controlling the operation of the process furnace 202 through the I/O control units.

The substrate processing apparatus controller 240 includes a display device control unit (manipulation unit) 239 which is connected to the process control unit 239a in a manner such that the display device control unit 239 can exchange data with the process control unit 239a. A display device such as a data display unit 240a and an input unit 240b such as a keyboard are connected to the display device control unit 239. The display device control unit 239 is configured to receive an input (such as a manipulation command) from an operator through the input unit 240b, and to control the data display unit 240a to display a screen such as a screen showing the state of the substrate processing apparatus 100 or a manipulation input screen.

In addition, the substrate processing apparatus controller 240 includes the carrying control unit 238 which is connected to the display device control unit 239 in a manner such that the carrying control unit 238 can exchange data with the display device control unit 239, and a mechanism I/O 238a which is connected to the carrying control unit 238 in a manner such that the mechanism I/O 238a can exchange data with the carrying control unit 238. Parts (such as the pod elevator 118a, the pod carrying mechanism 118b, the pod opener 121, the wafer transfer mechanism 125, and the boat elevator 115) of the substrate processing apparatus 100 are connected to the mechanism I/O 238a. The carrying control unit 238 is configured to collect (read) data indicating states (such as positions, opening/closing states, and operation and wait states) of parts of the substrate processing apparatus 100 while controlling operations of the parts of the substrate processing apparatus 100 through the mechanism I/O 238a.

In addition, the substrate processing apparatus controller 240 includes a data storage unit 239e connected to the display device control unit 239. The data storage unit 239e is configured to retain (store) data such as: programs for executing functions of the substrate processing apparatus controller 240; setting data (recipe data) for performing a substrate processing process in the process furnace 202; and data read from the I/O control units (the gas mass flow control unit 235, the pressure control unit 236, and the temperature control unit 237) and the carrying control unit 238.

In addition, the substrate processing apparatus controller 240 includes a communication control unit 239b connected to the display device control unit 239. In addition, although not shown in FIG. 2, the I/O control units (the gas mass flow control unit 235, the pressure control unit 236, and the temperature control unit 237), and the carrying control unit 238 are connected in a manner such that they can exchange data directly with the communication control unit 239b without having to go through the process control unit 239a or the display device control unit 239. In addition, the communication control unit 239b is connected to the group managing apparatus 500 (described later) through the network 400 in a manner such that the communication control unit 239b can exchange data with the group managing apparatus 500.

In addition, it is configured such that state data (such as temperatures, gas mass flows, and pressures) of the process furnace 202 read through the I/O control units (the gas mass flow control unit 235, the pressure control unit 236, and the temperature control unit 237) can be transferred to the communication control unit 239b through the process control unit 239a and the display device control unit 239, and the communication control unit 239b can send the received data to the group managing apparatus 500. In addition, it is configured such that state data (such as positions, opening/closing states, and operation and wait states) of parts of the substrate processing apparatus 100 read through the mechanism I/O 238a can be transferred to the communication control unit 239b through the carrying control unit 238 and the display device control unit 239, and the communication control unit 239b can send the received data to the group managing apparatus 500.

In addition, it is configured such that state data (such as temperatures, gas mass flows, and pressures) of the process furnace 202 read through the I/O control units can be transferred directly to the communication control unit 239b without going through the process control unit 239a and the display device control unit 239, and the communication control unit 239b can send the received data to the group managing apparatus 500. In addition, it is configured such that state data (such as positions, opening/closing states, and operation and wait states) of parts of the substrate processing apparatus 100 read through the mechanism I/O 238a can be transferred directly to the communication control unit 239b without going through the display device control unit 239, and the communication control unit 239b can send the received data to the group managing apparatus 500.

Although not shown in FIG. 2, it is configured such the I/O control units (the gas mass flow control unit 235, the pressure control unit 236, and the temperature control unit 237), and the carrying control unit 238 can exchange data directly with the group managing apparatus 500 without having to go through the process control unit 239a, the display device control unit 239, and the communication control unit 239b. Therefore, the I/O control units can send state data (such as temperatures, gas mass flows, and pressures) of the process furnace 202 directly to the group managing apparatus 500 without going through the process control unit 239a, the display device control unit 239, and the communication control unit 239b. In addition, it is configured such that the mechanism I/O 238a can send state data (such as positions, opening/closing states, and operation and wait states) of parts of the substrate processing apparatus 100 directly to the group managing apparatus 500 without going through the display device control unit 239 and the communication control unit 239*b*.

(7) Structure of Group Managing Apparatus

Next, mainly with reference to FIG. 2 and FIG. 5 to FIG. 9, an explanation will be given on the structure of the group managing apparatus 500 configured to exchange data with the substrate processing apparatus 100 according to the current embodiment.

Figure 7:
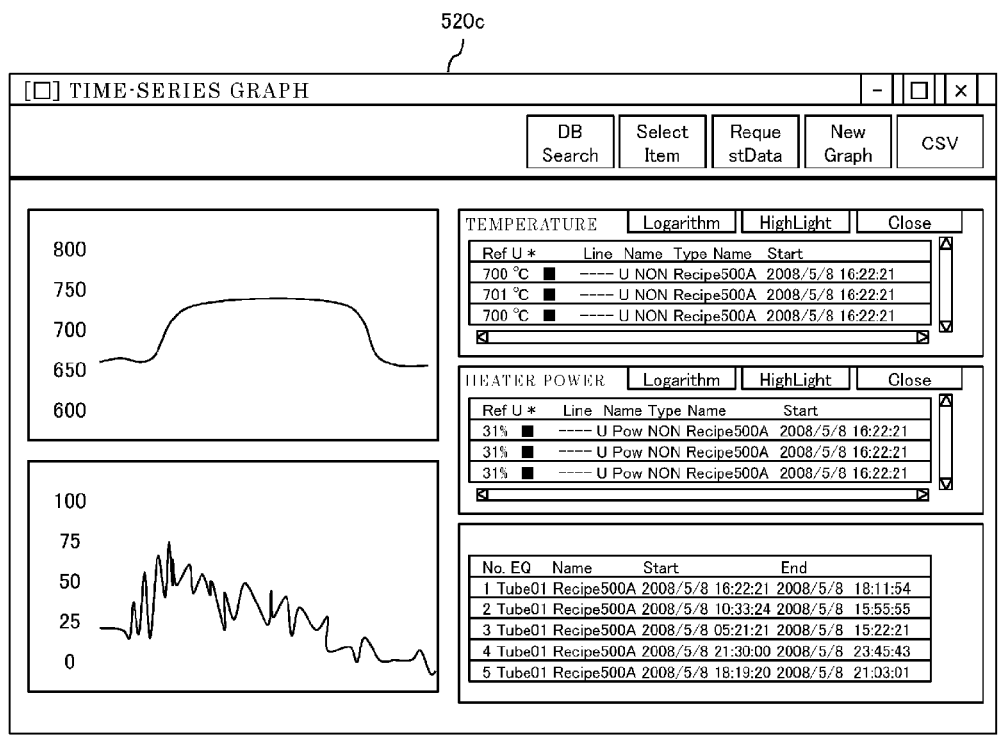
FIG. 7 is a schematic diagram illustrating an exemplary screen including a time-series graph according to the embodiment of the present invention.
Figure 9:
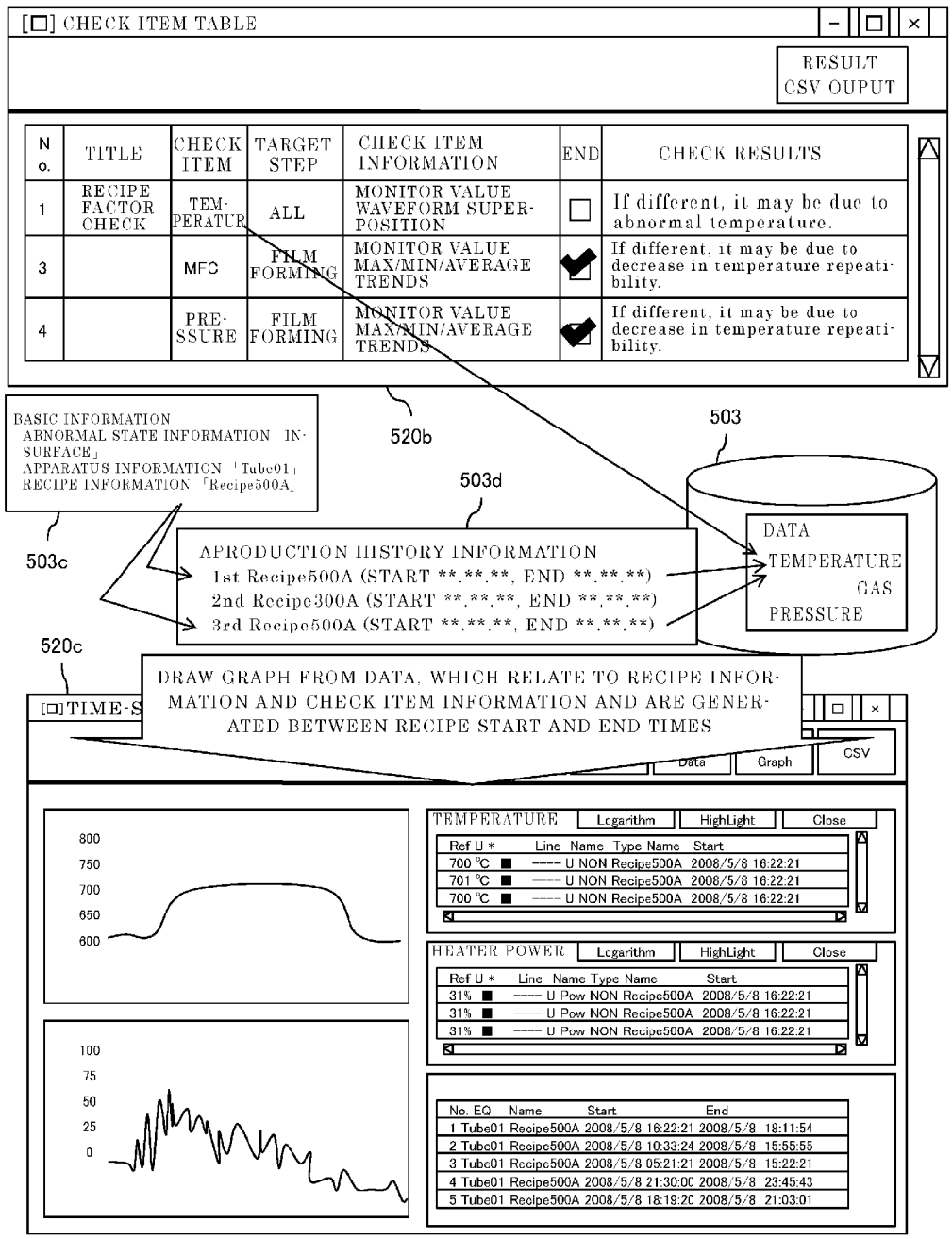
FIG. 9 is a schematic diagram illustrating a way of preparing a time-series graph by receiving a manipulation of selecting check item information included in the check item table, according to the embodiment of the present invention.

FIG. 5 is a schematic diagram illustrating an exemplary basic information input screen according to the current embodiment. FIG. 6 is a schematic diagram illustrating an exemplary check item table according to the current embodiment. FIG. 7 is a schematic diagram illustrating an exemplary screen including a time-series graph according to the current embodiment. FIG. 8 is a schematic diagram illustrating a part of an exemplary abnormal information analysis table and a way of preparing a check item table based on basic information, an apparatus type based table, and the abnormal information analysis table according to the current embodiment. FIG. 9 is a schematic diagram illustrating a way of preparing a time-series graph by receiving a manipulation of selecting check item information from the check item table according to the current embodiment.

As shown in FIG. 2, the group managing apparatus 500 is configured as a computer which includes: a control unit 501 configured by a central processing unit (CPU); a data storage unit 503 which is a storage unit including a memory having an internal share memory 502, and a storage device such as a hard disk drive (HDD); a data display unit 505 which is a display part configured by a display device; an input unit 506 such as a keyboard; and a communication control unit 504 which is a communication device. The memory, the data storage unit 503, the data display unit 505, the input unit 506, and the communication control unit 504 are configured to exchange data with the control unit 501, for example, through internal buses. In addition, the control unit 501 has a clock function (not shown).

(Communication Control Unit)

The communication control unit 504 which is a communication device is connected to the communication control unit 239*b* of the substrate processing apparatus controller 240, and is also connected to the I/O control units (the gas mass flow control unit 235, the pressure control unit 236, and the temperature control unit 237) and the carrying control unit 238. The communication control unit 504 is configured to receive data from the substrate processing apparatus 100 and transfer the data to the share memory 502. Apparatus information for identifying a substrate processing apparatus 100 which generated data; recipe information that specifies a recipe executed by the substrate processing apparatus 100 at the time the data were generated; data time information indicating the time when the data were generated; and check item information that specifies check items necessary for abnormal state analysis to find out a cause of an abnormal state are added to the data delivered to the share memory 502.

(Storage Unit)

The data storage unit 503, which is a storage unit, is configured to store readable information such as: apparatus type information for identifying the type of a substrate processing apparatus 100 in relation to apparatus information that identifies a substrate processing apparatus 100 at which an abnormal state is generated; abnormal state information for identifying an abnormal state generated while a recipe is executed; and check item information for specifying check items necessary for analyzing a cause of an abnormal state in relation to the apparatus type information.

As shown in FIG. 8, the data storage unit 503 is configured to store a readable apparatus type based table 503*b* in which apparatus type information (for example, CVD, ALD, diffusion, etc.) for identifying types of substrate processing apparatuses 100 is recorded in related to apparatus information (for example, Tube 01, Tube 02, Tube 03, etc.) for identifying a substrate processing apparatus 100 at which an abnormal state is generated.

In addition, the data storage unit 503 is configured to store a readable abnormal state analysis information table 503*a* containing check item information (for example, monitor value waveform superposition, monitor value average trends, monitor value maximum/minimum/average trends, monitor value waveform superposition (repetition in a batch), and trend from start to 10 seconds) for specifying check items necessary for analyzing a reason of an abnormal state in relation to abnormal state information (for example, in-surface, between-surfaces, decrease, and waste) for identifying an abnormal state generated when a recipe is executed and apparatus type information (for example, CVD, ALD, and diffusion). Furthermore, in the abnormal state analysis information table 503*a* shown in FIG. 8, the relationship between abnormal state information and check item information, and the relationship between apparatus type information and check item information are denoted by "o" marks. That is, if the abnormal state information is "in-surface" and the apparatus type information is "CVD", items denoted by "o" marks in both the abnormal state information and the apparatus type information (in the table, items of No. 1 and No 3 to No 6) are check item information related to both the abnormal state information and the apparatus type information. In addition, in the abnormal state analysis information table 503*a* shown in FIG. 8, check items, such as temperature, the degree of opening of MFC (or gas mass flow), pressure, the degree of opening of CKD, RF (the supply amount of power), and the content of ozonizer, which are data to be checked are defined for every check item information.

In addition, the data storage unit 503 stores data which are received by the communication control unit 504 and stored in the share memory 502 in a manner such that the data are readable in relation with apparatus information (for example, Tube 01, Tube 02, Tube 03, . . . ) for identifying a substrate processing apparatus 100 that has generated the data, recipe information (for example, Recipe 500A, Recipe 300A, Purge, etc.) for identifying a recipe executed by the substrate processing apparatus 100 when the data were generated at the substrate processing apparatus 100, data time information indicating the time when the data were generated; and check item information (for example, monitor value waveform superposition, monitor value average trends, monitor value maximum/minimum/average trends, monitor value waveform superposition (repetition in a batch), and trend from start to 10 seconds).

In addition, as shown in FIG. 9, the data storage unit 503 is configured to store production history information 503*d* that specifies repeated recipes, recipe start times, and recipe end times. The production history information 503*d* is configured such that recipes executed by the substrate processing apparatus 100 are stored to the time series.

In addition, a group managing program is stored in the data storage unit 503 as an analysis support unit 511. The group managing program is configured to be read from the memory of the data storage unit 503 and executed by the control unit 501.

(Analysis Support Unit)

The analysis support unit 511 is configured to receive basic information 503*c* including abnormal state information and apparatus information, acquire apparatus type information relating to the apparatus information by referring to the data storage unit 503, extract check item information relating to both the abnormal state information and the apparatus type information, and display the extracted check item information. The analysis support unit 511 is configured to create a check item table (check sequence table) 520b as shown in FIG. 6.

As shown in FIG. 5, the analysis support unit 511 controls the data display unit 505 to display a basic information input screen 520a so as to receive basic information 503c including abnormal state information (such as in-surface, between-surfaces, decrease, and waste), apparatus information (such as Tube 01, Tube 02, Tube 03, etc.), and recipe information (such as Recipe 500A, Recipe 300A, and Purge, etc.). Basic information including abnormal state information, apparatus information, and recipe information is input by using the basic information input screen 520a and the input unit 506. The basic information 503c is readably stored in the share memory 502 or the data storage unit 503 of the group managing apparatus 500.

If the analysis support unit 511 receives an input of the basic information 503c including the abnormal state information, the apparatus information, and the recipe information, the analysis support unit 511 acquires apparatus type information relating to the apparatus information with reference to the apparatus type acquired table 503b. For example, if apparatus information input through the basic information input screen 520a is "Tube 01" and the apparatus type based table 503b shown in FIG. 8 is referred to, the analysis support unit 511 takes "CVD" as apparatus type information.

Next, the analysis support unit 511 selects check item information relating to both the abnormal state information and the apparatus type information with reference to the abnormal state analysis information table 503a stored in the data storage unit 503. Then, the analysis support unit 511 displays at least one piece of the selected check item information so as to prepare a check item table 502b as shown in FIG. 6 and FIG. 8.

For example, if abnormal state information input through the basic information input screen 520a is "in-surface" (indicating an in-surface abnormal state), "CVD" is extracted as apparatus type information, and the abnormal state analysis information table 503a shown in FIG. 8 is referred to, the analysis support unit 511 extracts items (items of No 1 and No 3 to No 6 in the table of FIG. 8) indicated by o marks in both the abnormal state information and the apparatus type information as check item information relating to both the abnormal state information and the apparatus type information. That is, the analysis support unit 511 extracts "monitor value waveform superposition" of temperature, "monitor value average trend" of temperature, "monitor value maximum/minimum/average trends" of MFC, "monitor value maximum/minimum/average trends" of pressure, "monitor value waveform superposition" of CKD opening degree that indicates the degree of opening of a valve, and "monitor value maximum/minimum/average trends" of CKD opening degree. Then, the analysis support unit 511 displays the extracted check item information so as to prepare a check item table 502b as shown in FIG. 6 and FIG. 8. The analysis support unit 511 displays the check item table 502b on the data display unit 505.

In addition, the analysis support unit 511 is configured to receive a manipulation of selecting check item information from the check item table 502b and read data relating to both the recipe information and the check item information from the data storage unit 503. Then, based on data time information, the analysis support unit 511 draws a time-series superposition graph by using the read data while arranging recipe start times so as to provide a time-series graph 520c as shown in FIG. 7.

Specifically, if the check item table 502b shown in FIG. 6 is displayed on the data display unit 505 and "monitor value waveform superposition" of temperature is selected through the input unit 506 as check item information (for example, in FIG. 6, check item information corresponding to No. 1 is selected by clicking), the analysis support unit 511 receives the selecting manipulation.

After receiving the selection manipulation, the analysis support unit 511 acquires recipe information such as "Recipe 500A" by referring to the basic information 503c.

After acquiring the recipe information, the analysis support unit 511 searches the production history information 503d shown in FIG. 9 so as to determine whether the recipe information acquired from the basic information 503c is included in the production history information 503d. For example, the searching is performed on a plurality of recipes included in the production history information 503d in a reverse order from the latest recipe to the oldest recipe.

Then, if the analysis support unit 511 detects the recipe information of the basic information 503c from the production history information 503d, the analysis support unit 511 acquires the start and end times of the recipe information (for example, the start and end times of "Recipe 500A").

Then, the analysis support unit 511 reads data from the data storage unit 503 which are generated between the start and end times and relate to both the recipe information of "Recipe 500A" and the check item information of "monitor value waveform superposition" (for example, the analysis support unit 511 reads temperature data generated during the "Recipe 500A" was performed).

In addition, the analysis support unit 511 is configured to read data repeatedly so that data corresponding to a predetermined number of recipe execution can be read (for example, the analysis support unit 511 reads data in a reverse order from the latest execution of the recipe to the $10^{th}$ execution of the recipe).

In addition, the analysis support unit 511 is configured to acquire data not only from the substrate processing apparatus 100 where an abnormal state is generated but also from another substrate processing apparatus 100 distant from the substrate processing apparatus 100. That is, if the analysis support unit 511 detects the recipe information of the basic information 503c from a production history information 503d of the other substrate processing apparatus 100, the analysis support unit 511 acquires start and end times of the recipe information from the other production history information 503d and reads data from the data storage unit 503 which are generated between the start and end times and relate to both the recipe information and check item information.

Then, based on data time information relating to the read data, the analysis support unit 511 draws a time-series superposition graph while arranging recipe start times so as to provide a time-series graph 520c as shown in FIG. 7. Thereafter, the analysis support unit 511 displays the time-series graph 520c on the data display unit 505.

In addition, if display of the time-series graph 520c on the data display unit 505 is completed or a screen on which the time-series graph 520c is displayed is closed by the data display unit 505, the analysis support unit 511 adds a check mark on the check item table 520b to indicate the fact. For example, referring to FIG. 6, display of a time-series graph 520c relating to "monitor value average trend" of No. 2, and display of a time-series graph 520c relating to "monitor value maximum/minimum/average trends" of No. 3 have been completed.

In addition, if the analysis support unit 511 receives a check result output request (for example, if a comma-separated values (CSV) button of a screen displaying the time-series graph 520c is pressed) after the time-series graph 520c is drawn, the analysis support unit 511 outputs data included in the time-series graph 520c in the form of CSV.

(8) Operation of Group Managing Apparatus

Figure 3:
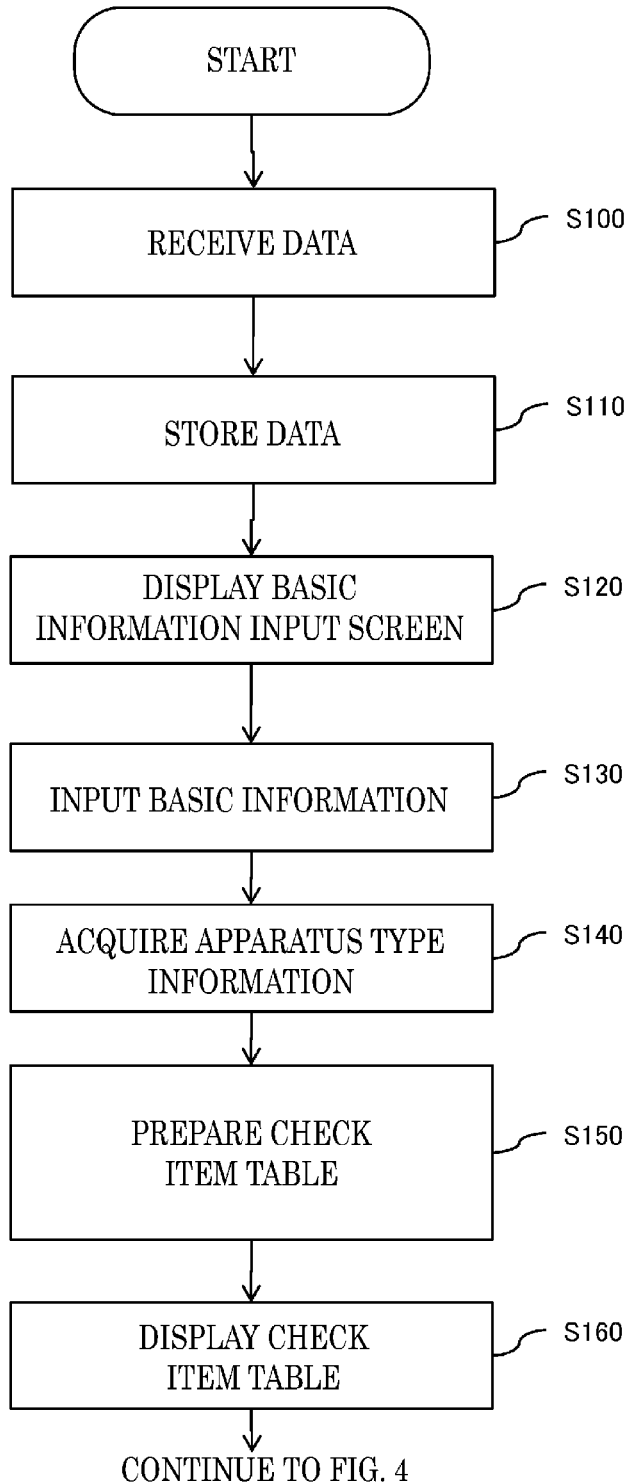
FIG. 3 is a flowchart illustrating exemplary operations of the group managing apparatus for preparing a check item table according to the embodiment of the present invention.
Figure 4:
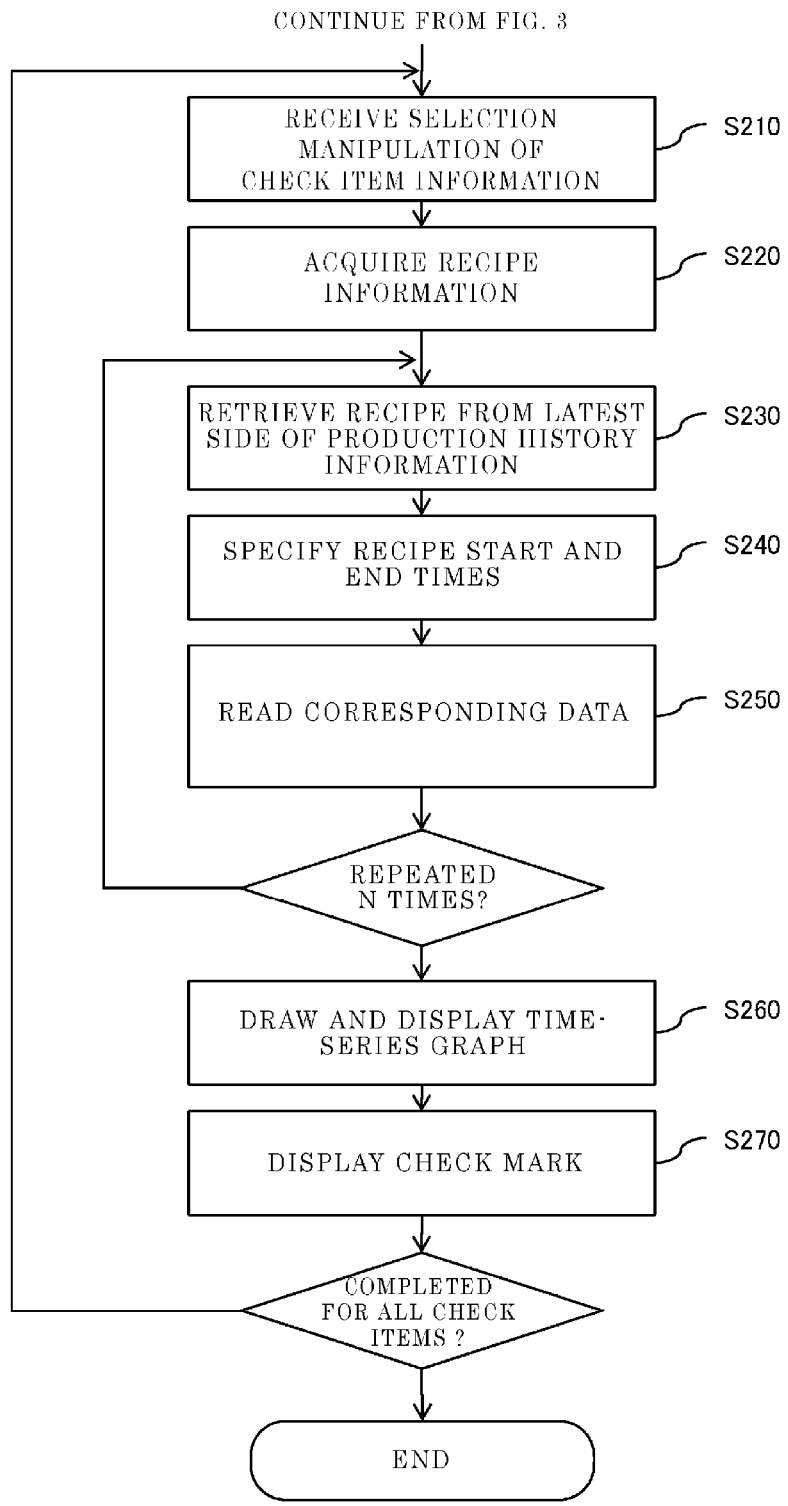
FIG. 4 is a flowchart illustrating exemplary operations of the group managing apparatus for preparing a time-series graph according to the embodiment of the present invention.

Next, with reference to FIG. 3 and FIG. 4, the operation of the group managing apparatus 500 will be explained according to the current embodiment. FIG. 3 is a flowchart illustrating exemplary operations of the group managing apparatus 500 for preparing and displaying a check item table according to the current embodiment. FIG. 4 is a flowchart illustrating exemplary operations of the group managing apparatus 500 for preparing and displaying a time-series graph according to the current embodiment. Such operations are performed as operations of a semiconductor device manufacturing process.

(Data Receiving Process S100)

First, the communication control unit 504 of the group managing apparatus 500 receives data indicating recipe progress states or the states of a substrate processing apparatus 100 from the substrate processing apparatus 100. The communication control unit 504 transfers the data received from the substrate processing apparatus 100 to the share memory 502. Apparatus information that specifies a substrate processing apparatus 100 which generated data; recipe information that specifies a recipe executed by the substrate processing apparatus 100 at the time the data were generated; data time information that specifies the time when the data were generated; and check item information that specifies check items necessary for abnormal state analysis to find out a cause of an abnormal state are added to the data transferred to the share memory 502.

(Data Storing Process S110)

Next, the data storage unit 503 of the group managing apparatus 500 stores the data of the share memory 502 in a manner such that the data can be read in relation with the apparatus information that identifies the substrate processing apparatus 100 which generated data; the recipe information that specifies a recipe executed by the substrate processing apparatus 100 at the time the data were generated; the data time information that specifies the time when the data were generated; and the check item information that specifies check items necessary for abnormal state analysis to find out a cause of an abnormal state.

(Basic Information Input Screen Displaying Process S120)

Next, the analysis support unit 511 of the group managing apparatus 500 controls the data display unit 505 to display a basic information input screen 520a so as to receive basic information 503c including abnormal state information (such as in-surface, between-surfaces, decrease, and waste), apparatus information (such as Tube 01, Tube 02, Tube 03, etc.), and recipe information (such as Recipe 500A, Recipe 300A, Purge, etc.).

(Basic Information Input Process S130)

Next, basic information 503c including abnormal state information, apparatus information, and recipe information is input by using the basic information input screen 520a and the input unit 506. The basic information 503c is readably stored in the share memory 502 or the data storage unit 503 of the group managing apparatus 500.

(Apparatus Type Information Acquiring Process S140)

If the analysis support unit 511 receives the input of the basic information 503c including the abnormal state information, the apparatus information, and the recipe information is input, the analysis support unit 511 acquires apparatus type information relating to apparatus information from the apparatus type acquired table 503b. For example, if "Tube 01" is input as apparatus information through the basic information input screen 520a, the analysis support unit 511 takes "CVD" as apparatus type information by referring to the apparatus type based table 503b exemplarily shown in FIG. 8.

(Check Item Table Preparing Process S150)

Next, the analysis support unit 511 extracts check item information relating to both the abnormal state information and the apparatus type information with reference to the abnormal state analysis information table 503a stored in the data storage unit 503. Then, the analysis support unit 511 displays the extracted check item information and prepares a check item table 520b as shown in FIG. 6 and FIG. 8.

(Check Item Table Displaying Process S160)

The analysis support unit 511 displays the check item table 520b on the data display unit 505.

(Process S210 of Receiving Manipulation of Selecting Check Item Information)

Next, the analysis support unit 511 receives a selection manipulation of check item information from the check item table 520b through the input unit 506 (for example, the analysis support unit 511 receives a selection manipulation such as clicking of check item information corresponding to No. 1 in FIG. 6 or FIG. 8).

(Recipe Information Acquiring Process S220)

Then, the analysis support unit 511 acquires recipe information such as "Recipe 500A" from the basic information 503c.

(Process S230 of Retrieving Recipe from Production History Information)

Thereafter, the analysis support unit 511 searches production history information 503d shown in FIG. 9 so as to determine whether the recipe information of the basic information 503c is included in the production history information 503d. For example, the searching is performed on a plurality of recipes included in the production history information 503d in a reverse order from the latest recipe to the oldest recipe.

(Process S240 of Acquiring Recipe Start and End Times)

Then, if the analysis support unit 511 detects the recipe information of the basic information 503c from the production history information 503d, the analysis support unit 511 acquires start and end times of the recipe information (for example, the analysis support unit 511 acquires start and end times of "Recipe 500A").

(Process S250 of Reading Corresponding Data)

Then, the analysis support unit 511 reads data from the data storage unit 503 which generated between the start and end times and relate to both the recipe information of "Recipe 500A" and the check item information of "monitor value waveform superposition" (for example, the analysis support unit 511 reads temperature data generated during the "Recipe 500A" was performed).

In addition, if the recipe identified by the recipe information was performed a plurality of times in the production history information 503d, the analysis support unit 511 reads data corresponding to a predetermined execution number (for example, the analysis support unit 511 reads data in a reverse order from the latest execution of the recipe to the $10^{th}$ execution of the recipe). That is, the analysis support unit 511 repeats operations S230 to S240 predetermined times.

(Time-Series Graph Preparing Process S260)

Then, based on data time information relating to the read data, the analysis support unit 511 draws a time-series superposition graph while arranging recipe start times so as to provide a time-series graph 520c as shown in FIG. 7. Thereafter, the analysis support unit 511 displays the time-series graph 520c on the data display unit 505.

(Check Mark Displaying Process S270)

Then, if display of the time-series graph 520c on the data display unit 505 is completed or a screen on which the time-series graph 520c is displayed is closed by the data display unit 505, the analysis support unit 511 adds a check mark on the check item table 520b to indicate the fact. In addition, if the analysis support unit 511 receives a check result output request (for example, if a CSV button of a screen displaying the time-series graph 520c is pressed) after the time-series graph 520c is drawn, the analysis support unit 511 outputs data included in the time-series graph 520c in the form of CSV.

(9) Effects of the Embodiment

According to the current embodiment, one or more of the following effects can be attained.

(a) According to the current embodiment, the analysis support unit 511 is configured to extract check item information relating to both abnormal state information and apparatus type information with reference to an abnormal state analysis information table 503a, and display the extracted check item information so as to prepare and display a check item table 520b. Since the check item table 520b is prepared in this way, a maintenance engineer can know check items necessary for abnormal state analysis without omitting any of them, and thus abnormal state analysis can be correctly performed. In addition, since check item information relating to both abnormal state information and apparatus type information is only included in the check item table 520b, a maintenance engineer may not inspect unnecessary check items, and thus abnormal state analysis can be carried out without wasting time. That is, abnormal state analysis can be quickly and correctly conducted independent of the skill of a maintenance engineer.

(b) According to the current embodiment, the analysis support unit 511 is configured to receive a manipulation of selecting check item information from the check item table 502b, read data relating to both recipe information and check item information from the data storage unit 503, draw a time-series superposition graph based on data time information by using the read data while arranging recipe start times so as to display a time-series superposition graph 520c on the data display unit 505. That is, if a maintenance engineer selects check item information from the check item table 520b, a time-series graph 520c can be automatically displayed. Owing to this configuration, a maintenance engineer can perform abnormal state analysis with less difficulty.

(c) According to the current embodiment, when the analysis support unit 511 draws a time-series graph 520c, the analysis support unit 511 can read data repeatedly so that data corresponding to a predetermined number of recipe execution can be read (for example, the analysis support unit 511 may read data in a reverse order from the latest execution of a recipe to the 10th execution of the recipe). Then, based on data time information relating to the read data, the analysis support unit 511 can draw a time-series superposition graph while arranging recipe start times so as to provide a time-series graph 520c as shown in FIG. 7 and display the time-series graph 520c on the data display unit 505. Owing to this, a maintenance engineer can perform abnormal state analysis with less difficulty in acquiring data.

(d) According to the current embodiment, when the analysis support unit 511 draws a time-series graph 520c, the analysis support unit 511 can acquire data not only from the substrate processing apparatus 100 where an abnormal state is generated but also from another substrate processing apparatus 100 distant from the substrate processing apparatus 100. That is, if the analysis support unit 511 detects the recipe information of the basic information 503c from a production history information 503d of the other substrate processing apparatus 100, the analysis support unit 511 acquires start and end times of the recipe information from the other production history information 503d and reads data from the data storage unit 503 which are generated between the acquired start and end times and relate to both the recipe information and check item information. Then, based on data time information relating to the read data, the analysis support unit 511 can draw a time-series superposition graph while arranging recipe start times so as to provide a time-series graph 520c as shown in FIG. 7 and display the time-series graph 520c on the data display unit 505. Owing to this, a maintenance engineer can perform abnormal state analysis with less difficulty in acquiring data.

(e) According to the current embodiment, the analysis support unit 511 is configured to receive an input of basic information 503c including abnormal state information, and acquire apparatus type information relating to apparatus information from an apparatus type based table 503b. Therefore, a maintenance engineer can know sufficient check items for abnormal state analysis without having to find out the type of an apparatus. That is, abnormal state analysis can be quickly and correctly conducted independent of the skill of a maintenance engineer.

(f) According to the current embodiment, if display of a time-series graph 520c on the data display unit 505 is completed or a screen on which the time-series graph 520c is displayed is closed by the data display unit 505, the analysis support unit 511 adds a check mark on the check item table 520b to indicate the fact. Owing to this, independent of the skill of a maintenance engineer, abnormal state analysis can be correctly conducted without omission.

(g) According to the current embodiment, if the analysis support unit 511 receives a check result output request (for example, if a CSV button of a screen displaying a time-series graph 520c is pressed) after a time-series graph 520c is drawn, the analysis support unit 511 outputs data included in the time-series graph 520c in the form of CSV. Owing to this, a maintenance engineer can perform abnormal state analysis with less difficulty in acquiring data.

Other Embodiments of the Present Invention

The present invention is not limited to the case where the substrate processing apparatus 100 and the group managing apparatus 500 are disposed on the same floor (in the same cleaning room). For example, the substrate processing apparatus 100 may be disposed in a cleaning room, and the group managing apparatus 500 may be disposed in an office (a floor different from the floor of the cleaning room). Then, recipe progress states or the states of the substrate processing apparatus 100 may be remotely monitored.

As well as a chemical vapor deposition (CVD) film-forming process, an atomic layer deposition (ALD) film-forming process, and a physical vapor deposition (PVD) film-forming process, the present invention may be suitably applied to other processes such as a diffusion process, an annealing process, an oxidizing process, a nitriding process, and a lithograph process. In addition, as well as a thin film forming apparatus, the present invention may be suitably applied to other substrate processing apparatuses such as an annealing apparatus, an oxidizing apparatus, a nitriding apparatus, an exposure apparatus, a coating apparatus, a drying apparatus, and a heating apparatus.

The present invention is not limited to the substrate processing apparatus of the current embodiment which is a semiconductor manufacturing apparatus configured to process a substrate (wafer). For example, the present invention may be suitably applied to other substrate processing apparatuses such as a liquid crystal display (LCD) manufacturing apparatus configured to process a glass substrate.

According to the substrate processing system of the present invention, a maintenance engineer can analyze an abnormal state with less difficulty in a rapid and correct manner independent of his/her skill.

While embodiments of the present invention have been described in detail, the present invention is not limited thereto, and many different embodiments are possible within the scope and spirit of the present invention.

<Supplementary Note>

The present invention also includes the following embodiments.

According to an embodiment of the present invention, there is provided a substrate processing system comprising: a substrate processing apparatus configured to operate according to a recipe defining a process sequence and process conditions; and a group managing apparatus connected to the substrate processing apparatus, wherein the group managing apparatus comprises:

a storage unit configured to store readable apparatus type information for identifying a type of the substrate processing apparatus in relation to apparatus information used to identify the substrate processing apparatus for a case where an abnormal state occurs at the substrate processing apparatus, and readable check item information for specifying a check item necessary for analyzing a cause of the abnormal state in relation to the apparatus type information and abnormal state information for identifying an abnormal state occurring when the recipe is executed; and an analysis support unit configured to receive basic information comprising the abnormal state information and the apparatus information, acquire apparatus type information relating to the apparatus information by referring to the storage unit, extract check item information relating to both the abnormal state information and the apparatus type information, and display the extracted check item information to prepare a check item table.

According to another embodiment of the present invention, there is provided a substrate processing system comprising: a substrate processing apparatus configured to operate according to a recipe defining a process sequence and process conditions; and a group managing apparatus connected to the substrate processing apparatus, wherein the group managing apparatus comprises:

a communication unit configured to receive data indicating a recipe progress state or a state of the substrate processing apparatus from the substrate processing apparatus;

a storage unit configured to store a readable apparatus type based table containing apparatus type information for identifying a type of the substrate processing apparatus in relation to apparatus information used to identify the substrate processing apparatus for a case where an abnormal state occurs at the substrate processing apparatus, and a readable abnormal state analysis information table containing check item information for specifying a check item necessary for analyzing a cause of the abnormal state in relation to the apparatus type information and abnormal state information for identifying an abnormal state occurring when the recipe is executed; and an analysis support unit configured to receive basic information comprising the abnormal state information and the apparatus information, acquire apparatus type information relating to the apparatus information by referring to the apparatus type based table, extract check item information relating to both the abnormal state information and the apparatus type information by referring to the abnormal state analysis information table, and display the extracted check item information to prepare a check item table.

According to another embodiment of the present invention, there is provided a substrate processing system comprising: a substrate processing apparatus configured to operate according to a recipe defining a process sequence and process conditions; and a group managing apparatus connected to the substrate processing apparatus, wherein the group managing apparatus comprises:

a communication unit configured to receive data indicating a recipe progress state or a state of the substrate processing apparatus from the substrate processing apparatus;

a storage unit configured to store a readable apparatus type based table containing apparatus type information for identifying a type of the substrate processing apparatus in relation to apparatus information used to identify the substrate processing apparatus for a case where an abnormal state occurs at the substrate processing apparatus, and a readable abnormal state analysis information table containing check item information for specifying a check item necessary for analyzing a cause of the abnormal state in relation to the apparatus type information and abnormal state information for identifying an abnormal state occurring when the recipe is executed, wherein the data received by the communication unit are readably stored in the storage unit in relation to recipe information for identifying the recipe executed by the substrate processing apparatus when the data are generated, time information specifying a generation time of the data, and the check item information; and an analysis support unit configured to receive basic information comprising the abnormal state information, the apparatus information, and the recipe information, acquire apparatus type information relating to the apparatus information by referring to the apparatus type based table, extract check item information relating to both the abnormal state information and the apparatus type information by referring to the abnormal state analysis information table, and display the extracted check item information to prepare a check item table, wherein the analysis support unit is configured to receive a selection manipulation of check item information from the check item table, read the data relating to both the recipe information and the check item information, and draw a time-series superposition graph based on the time information of the data while arranging start times of the recipe so as to provide a time-series graph.

Preferably, the storage unit may store readable recipe information for identifying a repeatedly executed recipe, and readable production history information for specifying start and end times of the recipe, and the analysis support unit may receive a selection manipulation of check item information from the check item table, acquire the start and end times of the recipe from the production history information, read the data from the storage unit which are generated between the start and end times of the recipe and are related to both the recipe information and the check item information, and draw a time-series superposition graph based on the time information of the data while arranging start times of the recipe so as to provide a time-series graph.

Preferably, the analysis support unit may display the time-series graph on a display unit, and if displaying of the time-series graph on the display unit is completed, the analysis support unit may add a check mark on the check item table to indicate completion of the displaying of the time-series graph.

Preferably, if the analysis support unit receives a check result output request after the time-series graph is drawn, the analysis support unit may output the data constituting the time-series graph.

According to another aspect of the present invention, there is provided a group managing apparatus connected to a substrate processing apparatus which is configured to operate according to a recipe defining a process sequence and process conditions, the group managing apparatus comprising:

a storage unit configured to store readable apparatus type information for identifying a type of the substrate processing apparatus in relation to apparatus information used to identify the substrate processing apparatus for a case where an abnormal state occurs at the substrate processing apparatus, and readable check item information for specifying a check item necessary for analyzing a cause of the abnormal state in relation to the apparatus type information and abnormal state information for identifying an abnormal state occurring when the recipe is executed; and an analysis support unit configured to receive basic information comprising the abnormal state information and the apparatus information, acquire apparatus type information relating to the apparatus information by referring to the storage unit, extract check item information relating to both the abnormal state information and the apparatus type information by referring to the storage unit, and display the extracted check item information to prepare a check item table.

According to another embodiment of the present invention, there is provided a group managing apparatus connected to a substrate processing apparatus which is configured to operate according to a recipe defining a process sequence and process conditions, the group managing apparatus comprising:

a communication unit configured to receive data indicating a recipe progress state or a state of the substrate processing apparatus from the substrate processing apparatus;

a storage unit configured to store a readable apparatus type based table containing apparatus type information for identifying a type of the substrate processing apparatus in relation to apparatus information used to identify the substrate processing apparatus for a case where an abnormal state occurs at the substrate processing apparatus, and a readable abnormal state analysis information table containing check item information for specifying a check item necessary for analyzing a cause of the abnormal state in relation to the apparatus type information and abnormal state information for identifying an abnormal state occurring when the recipe is executed; and an analysis support unit configured to receive basic information comprising the abnormal state information and the apparatus information, acquire apparatus type information relating to the apparatus information by referring to the apparatus type based table, extract check item information relating to both the abnormal state information and the apparatus type information by referring to the abnormal state analysis information table, and display the extracted check item information to prepare a check item table.

According to another embodiment of the present invention, there is provided a method of analyzing information of a substrate processing system including: a substrate processing apparatus configured to operate according to a recipe defining a process sequence and process conditions; and a group managing apparatus connected to the substrate processing apparatus, the method comprising:

a storage unit of the group managing apparatus storing readable apparatus type information for identifying a type of the substrate processing apparatus in relation to apparatus information used to identify the substrate processing apparatus for a case where an abnormal state occurs at the substrate processing apparatus, and readable check item information for specifying a check item necessary for analyzing a cause of the abnormal state in relation to the apparatus type information and abnormal state information for identifying an abnormal state occurring when the recipe is executed;

a communication unit of the group managing apparatus receiving data indicating a recipe progress state or a state of the substrate processing apparatus from the substrate processing apparatus; and an analysis support unit of the group managing apparatus receiving basic information comprising the abnormal state information and the apparatus information, acquiring apparatus type information relating to the apparatus information by referring to the storage unit, extracting check item information relating to both the abnormal state information and the apparatus type information by referring to the storage unit, and displaying the extracted check item information to prepare a check item table.

What is claimed is:

1. A substrate processing system comprising:
    a substrate processing apparatus configured to operate according to a recipe defining a process sequence and process conditions; and
    a group managing apparatus connected to the substrate processing apparatus,
    wherein the group managing apparatus comprises:
    a storage unit configured to store apparatus type information specifying a type of the substrate processing apparatus in an abnormal state in relation to apparatus information indicating the substrate processing apparatus is in the abnormal state, and check item information specifying a check item necessary for analyzing a cause of the abnormal state related to the apparatus type information and abnormal state information specifying the abnormal state occurring during execution of the recipe; and
    an analysis support unit configured to receive basic information comprising the abnormal state information and the apparatus information, acquire the apparatus type information related to the apparatus information by referring to the storage unit, extract the check item information related to the apparatus type information and the abnormal state information, and prepare a check item table comprising the extracted check item information.

2. The substrate processing system of claim 1, further comprising:
    a communication unit configured to receive data indicating a progress state of the recipe or a state of the substrate processing apparatus from the substrate processing apparatus,
    wherein the data received by the communication unit is stored in the storage unit in relation to recipe information specifying the recipe executed by the substrate processing apparatus when the data is generated, time information specifying a generation time of the data, and the check item information.

3. The substrate processing system of claim 2, wherein the group managing apparatus stores recipe information specifying a repeatedly executed recipe, and production history information specifying at least a start time and an end times of the recipe.

4. The substrate processing system of claim 3, wherein the group managing apparatus is configured to:
   acquire the start time and the end time of the recipe from the production history information;
   read the data generated during a period between the start time and the end times of the recipe and related to the recipe information and the check item information from the storage unit; and
   draw a time-series graph from the data based on time information specifying a generation time of the data by arranging the start times of the recipe.

5. The substrate processing system of claim 4, wherein the group managing apparatus displays a check mark to indicate completion of displaying of the time-series graph when the displaying of the time-series graph is completed.

6. A group managing apparatus connected to a substrate processing apparatus configured to operate according to a recipe defining a process sequence and process conditions, the group managing apparatus comprising:
   a storage unit configured to store apparatus type information specifying a type of the substrate processing apparatus in an abnormal state in relation to apparatus information indicating the substrate processing apparatus is in the abnormal state, and check item information specifying a check item necessary for analyzing a cause of the abnormal state related to the apparatus type information and abnormal state information specifying in the abnormal state occurring during execution of the recipe; and
   an analysis support unit configured to receive basic information comprising the abnormal state information and the apparatus information, acquire the apparatus type information related to the apparatus information by referring to the storage unit, extract the check item information related to the apparatus type information and the abnormal state information, and prepare a check item table comprising the extracted check item information.

7. The group managing apparatus of claim 6, further comprising:
   a communication unit configured to receive data indicating a progress state of the recipe or a state of the substrate processing apparatus from the substrate processing apparatus,
   wherein the data received by the communication unit is stored in the storage unit in relation to recipe information specifying the recipe executed by the substrate processing apparatus when the data is generated, time information specifying a generation time of the data, and the check item information.

8. The group managing apparatus of claim 7, wherein the group managing apparatus stores recipe information specifying a repeatedly executed recipe, and production history information specifying at least a start time and an end times of the recipe.

9. The group managing apparatus of claim 8, wherein the group managing apparatus is configured to:
   acquire the start time and the end time of the recipe from the production history information;
   read the data generated during a period between the start time and the end times of the recipe and related to the recipe information and the check item information from the storage unit; and
   draw a time-series graph from the data based on time information specifying a generation time of the data by arranging the start times of the recipe.

10. The group managing apparatus of claim 9, wherein the group managing apparatus displays a check mark to indicate completion of the displaying of the time-series graph when displaying of the time-series graph is completed.

11. A method of analyzing an abnormal state of a substrate processing apparatus, the method comprising:
   storing apparatus type information specifying a type of the substrate processing apparatus in an abnormal state in relation to apparatus information indicating the substrate processing apparatus is in the abnormal state and check item information specifying a check item necessary for analyzing a cause of the abnormal state related to the apparatus type information and abnormal state information specifying the abnormal state occurring during execution of the recipe;
   receiving basic information comprising the abnormal state information and the apparatus information;
   acquiring the apparatus type information related to the apparatus information by referring to the storage unit;
   extracting the check item information related to the apparatus type information and the abnormal state information; and
   preparing a check item table comprising the extracted check item information.

* * * * *